(12) United States Patent
Wegmann (10) Patent No.: US 7,307,707 B2
(45) Date of Patent: Dec. 11, 2007

(54) METHOD AND SYSTEM FOR MEASURING THE IMAGING QUALITY OF AN OPTICAL IMAGING SYSTEM

(75) Inventor: Ulrich Wegmann, Koenigsbronn (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 11/477,393

(22) Filed: Jun. 30, 2006

(65) Prior Publication Data

US 2006/0244950 A1    Nov. 2, 2006

Related U.S. Application Data

(63) Continuation of application No. 10/280,090, filed on Oct. 25, 2002, now Pat. No. 7,075,633.

(30) Foreign Application Priority Data

Oct. 25, 2001    (DE)    .............................. 101 54 125

(51) Int. Cl.
*G01B 9/00* (2006.01)
*G01K 9/40* (2006.01)
*J01J 1/20* (2006.01)

(52) U.S. Cl. ...................... 356/124; 356/618; 356/620; 250/201.9; 250/548; 355/53; 355/55

(58) Field of Classification Search ........ 356/121–127, 356/603–608, 618, 620; 250/548, 237 G, 250/227 G, 201.9; 355/53, 55, 67
See application file for complete search history.

(56) References Cited

U.S. PATENT DOCUMENTS 3,700,907 A    10/1972    Myer et al.

| | | |
|---|---|---|
| 3,912,396 A | 10/1975 | Hartmann |
| 4,429,992 A | 2/1984 | Häusler et al. |
| 4,772,120 A | 9/1988 | Pointeau |

(Continued)

FOREIGN PATENT DOCUMENTS

DE    30 20 022 A1    12/1981

(Continued)

OTHER PUBLICATIONS

Katsuyuki Omura, et al "Phase Measuring Ronchi Test", Applied Optics, vol. 27, No. 3, pp. 523-528, Feb. 1, 1988.

*Primary Examiner*—Sang H. Nguyen
(74) *Attorney, Agent, or Firm*—Sughrue Mion, PLLC (57) ABSTRACT

An object pattern is imaged by an imaging system onto the image plane of the imaging system at a location where a reference pattern suited to the object pattern is situated in order to measure the imaging fidelity of an optical imaging system, for example, an eyeglass lens, a photographic lens, or a projection lens, for use in the visible spectral range. The resultant, two-dimensional, superposition pattern is detected in a spatially resolved manner in order to determine imaging parameters therefrom. The object pattern is generated with the aid of at least one electronically controllable pattern generator that serves as a self-luminous, electronically configurable, incoherent light source and may, for example, have a color monitor. The measuring system allows rapidly, flexibly, checking optical imaging systems with minimal time and effort spent on the mechanical setup required.

13 Claims, 7 Drawing Sheets

U.S. PATENT DOCUMENTS

| | | | |
|---|---|---|---|
| 4,993,826 A | 2/1991 | Yoder, Jr. | |
| 5,022,753 A | 6/1991 | Dey | |
| 5,062,702 A | 11/1991 | Bille | |
| 5,062,705 A | 11/1991 | Sato et al. | |
| 5,319,445 A | 6/1994 | Fitts | |
| 5,355,210 A | 10/1994 | Keren et al. | |
| 5,424,552 A * | 6/1995 | Tsuji et al. | 250/548 |
| 5,548,396 A | 8/1996 | Morita et al. | |
| 5,631,731 A | 5/1997 | Sogard | |
| 5,635,285 A | 6/1997 | Bakeman et al. | |
| 5,742,381 A | 4/1998 | Ueno | |
| 5,767,959 A | 6/1998 | Kobayashi | |
| 5,796,512 A | 8/1998 | Wachman et al. | |
| 5,872,625 A | 2/1999 | Kajino et al. | |
| 5,883,982 A | 3/1999 | Riley et al. | |
| 5,959,726 A | 9/1999 | Riley et al. | |
| 5,973,773 A | 10/1999 | Kobayashi | |
| 6,034,766 A | 3/2000 | Sugiura et al. | |
| 6,084,712 A | 7/2000 | Harding | |
| 6,693,704 B1 | 2/2004 | Ooki et al. | |
| 6,763,133 B1 | 7/2004 | Park et al. | |
| 6,813,002 B2 * | 11/2004 | Ota | 355/55 |
| 6,816,247 B1 | 11/2004 | Heppner et al. | |
| 6,977,718 B1 * | 12/2005 | LaFontaine | 355/67 |
| 7,142,284 B2 * | 11/2006 | Mishima | 355/53 |
| 2002/0001088 A1 | 1/2002 | Wegmann et al. | |

FOREIGN PATENT DOCUMENTS

| | | |
|---|---|---|
| DE | 0154 239 | 3/1982 |
| DE | 256 916 A1 | 5/1988 |
| DE | 195 38 747 A1 | 4/1997 |
| DE | 297 24 139 U1 | 3/2000 |
| DE | 101 09 929 A1 | 11/2001 |
| EP | 0 418 054 B1 | 3/1991 |

* cited by examiner

METHOD AND SYSTEM FOR MEASURING THE IMAGING QUALITY OF AN OPTICAL IMAGING SYSTEM

CROSS REFERENCE TO RELATED APPLICATIONS

This is a continuation of U.S. application Ser. No. 10/280,090 filed on Oct. 25, 2002, now U.S. Pat. No. 7,075,633 which claims priority from German Patent Application No. 10154125.2 filed on Oct. 25, 2001. The entire disclosures of U.S. application Ser. No. 10/280,090 and German Application No. 10154125.2 are hereby incorporated by reference in their entirety.

FIELD OF AND BACKGROUND OF THE INVENTION

The invention relates to a measuring method and measuring system for measuring the imaging fidelity of an optical imaging system.

Optical imaging systems are employed in numerous fields of engineering and research that impose increasingly stringent demands on their imaging fidelity. An example of such a field is photolithographic fabrication of semiconductor devices and other types of microdevices, under which sub-micrometer-scale structures are created using high-performance projection lenses. Another example is photographic lenses of all types, which are usually subject to less stringent demands on their imaging fidelities.

Imaging optics frequently have elaborate layouts involving numerous lenses, which usually makes it impossible to derive their optical properties from theoretical computations. The optical properties of imaging systems thus must be reliably measured, where the accuracy of the method employed for testing the imaging systems involved is normally adapted to suit the demands imposed on their imaging accuracies.

Interferometric measurement methods are frequently employed. A device operating similarly to a shearing interferometer that allows making rapid, high-precision, measurements on photolithographic projection lenses is described in the German patent application having the filing code DE 101 09 929.0. In the case of that device, a mask illuminated by incoherent light is arranged in the object plane of the imaging system to be tested. The mask comprises a rigid, transparent, substrate fabricated from, for example, quartz glass, to which a two-dimensional object pattern is applied by, for example, suitable coating it with chromium. A reference pattern configured in the form of a diffraction grating is arranged in the image plane of the imaging system. Superimposing the waves created by diffraction on one another generates a superposition pattern in the form of an interferogram that is detected with the aid of a suitable (spatially resolving) detector.

Several interferograms having differing phases are required in order to compute two-dimensional phase distributions from these interferograms. Their phase may be varied either by displacing the diffraction grating on the object end of the imaging system involved or by displacing the mask on its object end. The lengths of travel employed in this procedure, which is termed "phase shifting," are typically fractions of the grating periods involved. For practical reasons, in the case of interferometers employed for measuring high-resolution, microlithographic reduction lenses, the grating on the latter's image end bearing the reference pattern is usually translated, since both the lengths of travel on their object ends and the masses of the items that have to be translated are greater.

The accuracies of these phase shifts significantly affect measurement accuracy and must be accurately controlled to within a few nanometers in the case of applications in which spatial resolutions of the order of nanometers are to be assessed. Since a two-dimensional diffractive structure having several periodicity directions is preferably employed, displacing the grating substrate along mutually orthogonal periodicity directions orthogonal to the optical axis of the imaging system involved is required. In order to determine the contrast of interference fringes along an imaging direction, the contrast of interference fringes along another imaging direction is reduced to zero by a relatively rapid motion of the grating, with or without reversals of its direction of motion. In the case of this oscillatory motion of the grating in the plane of the grating, any displacements of the grating out of that plane are to be avoided at all times. These demands on the mechanism controlling the motions of the grating result in a relatively complicated design of that mechanism. Furthermore, reactions due to forces caused by accelerations may affect the entire setup and cause vibrations that will adversely affect metric accuracy.

Other interferometric devices for wavefront detection are described in, for example, the article entitled "Phase measuring Ronchi-test" by Omura, et al, that appeared in Applied Optics, Vol. 27, No. 3, pp. 523-528, German Patent Application DD 0 154 239, or German Patent Application DE 195 38 747.

Other testing methods, in particular, methods for measuring the distortion of optical systems, are based on utilization of the moiré effect. In the case of those methods, an object grating comprising, for example, a large number of parallel, opaque, lines forming an object pattern, is arranged in the object plane of the optical system to be tested. An image pattern similar to that object pattern is arranged in its image plane, where the object pattern and image pattern are adapted to suit one another such that a superposition pattern in the form of a moiré-fringe pattern is generated when the object pattern is imaged onto the image pattern by the imaging system. Imaging parameters, in particular, parameters indicating distortion generated by the imaging system, may be determined from the intensity distribution of this fringe pattern. Moiré methods are known from, for example, U.S. Pat. No. 5,767,959, whose content is largely identical to that of U.S. Pat. No. 5,973,773 or European Patent EP 0 418 054.

Separate light sources or illumination devices are provided for illuminating the respective semitransparent masks involved.

OBJECTS OF THE INVENTION

The invention is based on an object of providing a measuring method and an associated measuring system that will allow rapid, flexible measuring of the imaging fidelities of optical imaging systems. It is a further object of the invention to impose relaxed demands on the mechanical configuration of the measuring system.

SUMMARY OF THE INVENTION

In order to address these and other objects, the invention proposes a measuring method for measuring the imaging fidelity of an optical imaging system having the following steps:

generating, in the vicinity of the object surface of the imaging system, at least one object pattern to be imaged, employing at least one electronically controllable pattern-generating device;

providing, in the vicinity of the image surface of the imaging system, a reference pattern adapted to suit the object pattern to be imaged;

superimposing an image of the object pattern on the reference pattern in order to generate a superposition pattern;

spatially resolved detection of that superposition pattern; and determining at least one imaging parameter indicative of the imaging fidelity of the imaging system from that superposition pattern.

In keeping therewith, an associated measuring system for measuring the imaging fidelity of an optical imaging system includes:

a device for generating at least one object pattern in the vicinity of the object surface of the imaging system, where this device comprises at least one electronically controllable pattern-generating device and an electronic controller designed for controlling that pattern-generating device;

a reference pattern adapted to suit that object pattern that is arranged on the image surface of the optical imaging system;

a detector for spatially resolved detection of a superposition pattern; and a device for determining at least one imaging parameter indicative of the imaging fidelity of the imaging system from that superposition pattern.

Since, in the case of measurements on imaging systems, the light path involved is, in principle, reversible, any surface conjugate to their object surface, for example, the surface that serves as their image surface when they are employed as intended, may be employed as the object surface. In view thereof, according to the invention, the reference pattern may also be generated with the aid of an electronically controllable pattern-generating device. Methods wherein both the object pattern and the reference pattern are electronically generated are also to be included thereunder. The object surface and image surface may be planar, particularly in the case of photographic applications or applications to photolithography. In the case of other applications, such as applications to movie projectors or planetarium projectors, simply curved or compound-curved image and/or object surfaces are also encountered. Depending upon the particular application involved, the object pattern and/or reference pattern may be arranged either accurately on the object surface or reference surface, respectively, or in their vicinities, instead of on those surfaces.

The invention thus proposes providing that at least one of the patterns to be superimposed on one another, in particular, the object pattern, be electronically generated, rather than a rigid mask having a predetermined geometry and, consequentially, a predetermined imageable pattern. This replacement of at least one rigid, physical, mask, for example, an illumination mask, by an electronically generatable equivalent in accordance with the invention allows dispensing with some or all rigid, physical, conventional types of masks.

Electronic generation of at least one pattern opens up new avenues when employed in combination with measurements on optical components. For example, the object pattern may be altered by electronically controlling the pattern-generation device employed for electronically generating a pattern that has been altered relative to a basic status, without need for employing any mechanically driven parts. For example, the alteration of the object pattern may comprise a translation and/or rotation on an object surface, where the object pattern as a whole may preferably remain essentially unaltered in terms of its shape and dimensions, i.e., for example, in terms of its grating constant(s) in the case of a linear grating or graticule, which will allow replacing mechanically driven motions of a mask by electronically generated motions of an electronically generated pattern. This replacement of mechanical mechanisms by electronics may, for example, be beneficially employed for generating the phase shifts mentioned above by electronically stepping a largely unaltered pattern along an image direction. Similarly, an inherently largely unaltered pattern may be rotated about an axis oriented parallel to the optical axis of the measuring system employed. Such rotations may, for example, be beneficial in the case of the moiré method mentioned above in order to determine distortion components along various image directions without need for rotating the lens to be measured about its longitudinal axis.

Alterations of the object pattern (and/or reference pattern) that would be impossible employing conventional, rigid, masks due to their natures are also feasible. For example, the alteration of the object pattern might comprise a stretching or compression of its basic arrangement, i.e., a change of spacing along at least one image direction. For example, a one-dimensional stretching of a linear grating consisting of parallel lines orthogonal to its lines may be utilized in order to alter its grating constant. A corresponding effect on two-dimensional gratings, for example, graticules or checkerboard gratings, may be obtained by stretching/compressing their patterns along two mutually orthogonal image directions. Radially symmetric stretchings/compressions of radially symmetric grating patterns, for example, concentric circles, are also feasible.

The invention also allows a new type of measuring method, which shall herein be termed the "radial-shearing method." This method employs object patterns that have a translation center within their patterned area. In the case of phase shifts, the alteration of the object pattern comprises a translation of its patterned structures along radial directions whose origins coincide with its translation center, where, in particular, the periodicities of its patterned structures, i.e., their grating constants, may be held constant during that translation. For example, in the case of a radial-shearing interferometer, the diffraction grating involved may be rotationally symmetric, and, in particular, may consist of an arrangement of concentric circular lines. The diffraction orders, or shearing directions, are orthogonal to the grating lines, i.e., are radially disposed with respect to the center of the array of rings. If its grading period remains uniform, or is held constant, the diffraction angles along the radial direction will be constant. The shearogram will thus yield the wavefront shifts along the radial direction. These radial phase shifts may be employed in either shearing interferometry (interferometry employing a mask and a diffraction grating) or moiré methods (methods employing an object or image grating). Radial phase shifts of radially symmetric, in particular, rotationally symmetric, patterns orthogonal to grating lines are impossible if rigid, physical, conventional types of gratings are employed.

In addition to rotationally symmetric object and/or reference patterns, other radially symmetric patterns, for example, patterns having multiple rotational symmetries, may also be generated and employed. For example, gratings having threefold or fourfold symmetry may be employed for measuring geometric shapes, such as pyramids, octahedra, or similar.

In general, the invention allows employing virtually arbitrary pattern geometries or grating geometries adapted to suit special measurement tasks and conducting phase-shift methods employing those grating geometries. For example, object patterns that have at least one periodicity-direction gradient and/or a periodicity gradient within their patterned areas may be utilized. Such gradients allow having several two-dimensional sections or zones having patterns with differing periodicity directions and/or periodicities, where, in the case of continually varying gradients, their periodicity directions and periodicities may gradually merge into one another. Defining clearly delimited areas or zones in order to allow making measurements on, for example, multifocal lenses, is also feasible. In order to generate phase shifts, the translations of the grating patterns may be performed along differing translation directions or translation paths separately for several zones, since the invention allows totally independently utilizing zones within a patterned area having several zones.

A variation on the method provides that the alteration of the object pattern comprises superimposing a prescribed intensity profile on the object pattern. For example, that superposition might involve altering a periodic object pattern having an essentially constant average image brightness over the entire image field such that the image brightness monotonically increases or decreases from the center of the image field out to its perimeter. An intensity gradient along an image direction might also be generated, if necessary. Superimposing an intensity profile on the object pattern may be utilized as, for example, a substitute for conventional neutral-density filters in order to, for example, adjust the luminous-intensity distribution incident on a spatially extended detector to suit its spatial responsivity characteristics.

Alterations of object patterns comprising superimposing a prescribed distortion profile on them in order to generate a slightly distorted pattern from a geometrically ideal pattern are also feasible. This approach may be utilized to, e.g., generate a residual distortion in object patterns that compensates for corresponding distortion errors in imaging optics that follow them in the optical train, on whose output end a geometrically ideal pattern will then be generated.

All object patterns and variations on the method will also allow generating an object pattern that has an at least piecewise continuously varying transmittance or reflectance along at least one direction lying on the object surface in a simple manner. Object patterns or masks having gray scales in order to, for example, obtain a sinusoidal variation of their transmittance or reflectance, are thus feasible. Variations of that type allow greater freedom in defining their coherence function in order to, for example, optimize their low-order interference-fringe contrast and suppress higher orders that act as sources of interference. In the case of conventional methods, fabricating masks having gray scales is time-consuming, since, for example, dithering techniques will have to be employed in conjunction therewith.

A significant reduction in parts or component counts may be achieved in the case of a preferred embodiment by virtue of the fact that its pattern-generation device comprises a self-luminous, electronic, two-dimensionally configurable, illumination unit, which allows measurement directions for which the light source involved is itself two-dimensionally configurable in a controlled manner. In the case of an application in the visible spectral region, high-intensity color displays, digital projectors, plasma-discharge monitors, or similar, may be employed as illumination units and may serve as computer-controlled, configurable, self-luminous, light sources. Of course, the same also holds true for monochromatic embodiments. These displays may be followed by one or more optical devices that project the pattern appearing on their self-luminous screen onto the object plane or object surface of the imaging system to be measured in order to, for example, adjust image magnification/demagnification and the pupillary illumination level to suit the testing tasks involved, depending upon the particular testing task involved and the spatial resolution of the display employed. In the case of this latter embodiment, the functions of the separate, conventional, light source and object mask are combined in a single unit having a self-luminous illumination unit, in which case, no separate light sources will be needed.

Alternatively thereto, or in addition thereto, it will also be feasible to employ at least one partially transparent or partially reflecting mask having an electronically generatable and/or alterable, two-dimensional, opaque or reflective, mask pattern that assumes the task of conventional, opaque, patterns on mask substrates when generating the object pattern. For example, employment of components, such as liquid-crystal arrays (LCD-units) or similar switchable elements that allow spatially resolved variations of their transmittance or reflectance, will be feasible. They might be used as substitutes for conventional types of transmitting or reflecting masks if the particular application involved will allow. Illumination of these electronically controllable mask units might employ, for example, refractive or diffractive elements, microlenses, fiberoptic lightguides, or similar.

An embodiment that is particularly well-suited to performing measurements on photographic lenses and other optical imaging systems for use in the visible spectral region provides for transmission of light having differing wavelengths through the optical imaging system involved and spatially resolved detection of several superposition patterns correlated to the various respective wavelengths involved, where light having differing wavelengths or comprising differing, narrow, wavelength ranges may be employed in sequence. However, it will be preferable if several wavelengths or wavelength ranges that, e.g., correspond to the primary colors red, green, and blue, are simultaneously employed or are employed in parallel. Simultaneous, monochromatic, measurements may be performed in a simple manner by providing that a polychromatic light source that is capable of emitting, preferably simultaneously emitting, light having differing wavelengths or comprising differing wavelength ranges is provided on the illumination end. This polychromaticity may also be generated by employing suitable filters. A spatially resolving detector that is responsive to several wavelengths and might, for example, be a color camera having a suitable CCD-chip, is preferably provided on the detection end. The preferably simultaneous utilization of several wavelengths allows qualitatively assessing in a simple manner, imaging errors (chromatic aberrations) of imaging optics that depend upon the wavelength of the light employed. Although two different wavelengths (wavelength ranges) might be sufficient here, employing more than two, in particular, three, different colors or wavelengths is preferable in order to obtain reliable spectral data. Preferred application areas of the polychromatic measurements described here are to the fields of measuring optics, e.g., photographic lenses, lenses employed for aerial surveys, medical optics, or similar, intended for use in the visible spectral region. Wavelengths (wavelength ranges) falling outside the visible spectral region, e.g., wavelengths falling in the infrared (IR) or ultraviolet (UV) spectral regions, may also be employed.

The polychromatic measurements, in particular, interferometric measurements, discussed here may be beneficially employed in the case of any measuring methods for measuring the imaging fidelities of optical imaging systems, in particular, may also be employed in the case of measuring methods that employ rigid, non-electronically alterable, conventional types of masks, regardless of the characteristics of the invention.

The invention may be utilized for performing either single-channel or multichannel measurements. In the case of single-channel measurements, it may be provided that the object pattern and/or image pattern may be translated along the surfaces on which they are arranged using translation devices in order to allow performing measurements at various field points distributed over the entire image field in order to, in that manner, e.g., scan an entire image field. Multichannel measurements, in which several field points that are from remote from one another may be simultaneously measured, may be readily accomplished using the invention by subdividing the object pattern into a large number of adjacent pattern segments that normally will have the same shape. The subdivision involved may be achieved by, for example, subdividing the surface of a monitor screen into identical subsections covering its entire area or by providing several monitor screens, projectors, or similar that may be simultaneously controlled, if necessary.

If the type of imaging system to be measured, the space available, and other limiting conditions will permit, it may be beneficial if at least one secondary radiating surface situated in the beam path, between a primary source of radiation and the imaging system to be measured, is irradiated when generating the object pattern. The secondary radiating surface involved may, for example, be in the form of a ground-glass plate, diffusor, and/or reflecting secondary radiating surface in the form of, for example, a projection screen. This secondary radiating surface is preferably mounted in the vicinity of the object plane. The shape (planar, simply curved, or compound curved) of its surface may be adapted to suit the optics to be measured. For example, movie screens frequently have cylindrical shapes, since the associated projection optics have cylindrical image surfaces. This fact may be taken into account during measurements by providing a suitably curved secondary light source.

A variation on the method provides that, in order to generate the object pattern, a secondary radiating surface having at least one light ray that may be reoriented relative to the secondary radiating surface in a controlled manner is irradiated such that the object pattern is written within the duration of a write interval. In the case of this writing projection, a laser projector, for example, a laser projector incorporating a scanning mirror, may be employed as the light source. The time required for "writing" a complete object pattern is preferably synchronized to the exposure time of a camera provided on the detection end. Either reflecting or transmitting secondary radiating surfaces may be utilized, depending upon the setup involved.

Providing at least one secondary radiating surface, which may be either planar or curved, for example, cylindrical or dome-shaped, on the detector end is also feasible. A secondary radiating surface that performs a frequency conversion in order to, for example, allow making better use of detector responsivity, may also be configured, if necessary. This secondary radiating surface may be arranged either at a large distance from the reference pattern, or in its immediate vicinity.

BRIEF DESCRIPTION OF THE DRAWINGS

The aforementioned and other characteristics of the invention are as stated in the accompanying claims, description, and figures, where the individual characteristics involved may represent either themselves alone or several such in the form of combinations of subsets thereof that appear in an embodiment of the invention and have been implemented in other fields, as well as beneficial embodiments that may alone be inherently patentable. The accompanying figures depict:

DETAILED DESCRIPTION OF THE PREFERRED EMBODIMENTS

A first embodiment of a measuring system 1 according to the invention that may be employed for, for example, measuring photographic lenses, and operates in the same manner as a shearing interferometer will now be discussed based on the schematized, longitudinally sectioned, drawing shown in FIG. 1. This measuring system comprises a pattern-generation device having a color monitor 2 that, in the case of other embodiments, may be replaced by projection optics, e.g., a beamer. The color monitor 2 may be regarded as a polychromatic, two-dimensionally configured or configurable, incoherent light source for the measuring system. The color monitor is followed by imaging optics 3 for reducing images displayed on the monitor, where these imaging optics 3 are arranged such that the image displayed on the monitor falls on an entrance surface of a flexible image guide 4. The exit end of this image guide 4 is arranged in the object plane 5 of the optical imaging system that follows it in the optical train. The optical system 6 to be tested is mounted on a test mount (not shown) that is insulated against vibrations. The end of the image guide facing the optical system 6 to be tested may be translated along the object plane (x-y plane) using a translation device (not shown), as well as along a direction orthogonal to the object plane, in order to allow precisely arranging it in that plane.

The optical system 6 to be tested, whose optical axis 7 is aligned parallel to the optical axis of the measuring system and parallel to this z-direction, comprises several lenses, only two of which are symbolically indicated, and images the image appearing on the exit end of the image guide 4 onto the image plane 8 of the optical system to be tested. A diffraction grating 9, for example, a checkerboard grating, that serves as a reference pattern of the measuring system is arranged in that image plane 8. A ground-glass plate or diffusor 10 that serves as a secondary radiating surface on the detection end is arranged normal to the optical axis 7 at a distance from the diffraction grating 9 in order to make interference patterns occurring behind the diffraction grating 9 viewable. This ground-glass plate 10 is arranged in the object plane of a color camera 11 that allows spatially resolved, two-dimensional, detection of superposition patterns captured by the ground-glass plate 10. Detection of interferograms by the color camera may be spectrally selective for several wavelengths simultaneously. The detector 11 comprises a photosensitive sensor surface 12, e.g., a CCD-chip, and an imaging system 13 that is arranged between the diffraction grating 9 and sensor surface and images interferograms or shearograms appearing on the ground-glass plate 10 onto the sensor surface 12. The detector 12 is connected to a computer unit 14 on which suitable image-processing software that configures the computer unit such that it may serve as a device for determining at least one imaging parameter of the optical system 6 to be tested from the detected superposition pattern (interferogram) is installed. The computer unit 14 also operates as a control computer for controlling the imaging color monitor 2 in order to, for example, generate various types of two-dimensional object patterns on the monitor's surface.

Measurement of the imaging fidelity of the optical system 6 to be tested and the associated determination of at least one imaging parameter, e.g., distortion, chromatic aberration, etc., indicative of its imaging fidelity using the measuring device 1 may be performed as follows: That portion of the computer unit 14 for controlling the color monitor generates a suitable object pattern that may correspond to a mask pattern on conventional, rigid, masks on the high-brightness monitor 2. The object pattern involved might, for example, be that appearing on a perforated mask having a two-dimensional, symmetrically distributed, array of holes. The shape, color, and location of that mask pattern are electronically generated and adapted to suit the type and period(s) of the pattern on the diffraction grating 9, duly allowing for the demagnification of the reduction optics 3 that follows and the magnification/demagnification of the optical system 6 to be tested. The pattern on the diffraction grating may, for example, be a checkerboard pattern or an array of lines.

For example, the location and/or orientation of the pattern electronically generated on the surface of the screen of the color monitor may be altered be under software control. The reduction optics 3 images the onscreen image onto the entrance surface of the flexible image guide 4. The object pattern then appears in the form of a demagnified image of the mask pattern at the exit end of the image guide, which is situated in the object plane 5. This object pattern may be regarded as an incoherent, radiating, object having an electronically predeterminable structure or as a wavefront source of the interferometer. The exit end of the image guide may be brought up to the object plane and, if necessary, translated over the object plane, using the x-y-z translation unit. The optical system 6 to be tested images the object pattern onto its image plane 8, where the diffraction grating 9 serving as a reference pattern is situated. When an image of the object pattern is superimposed on this reference pattern in order to generate a superposition pattern, the diffraction grating in the image plane generates various diffraction orders whose coherent superpositions generate an interferogram that is made viewable by the ground-glass plate 10 that follows. The contrast of the resultant interference fringes is determined by the degree of spatial coherence existing in the plane of the grating, which is determined by the suitability of the layouts of the (electronically generated) mask and diffraction grating, duly allowing for the magnifications/demagnifications involved. The resultant interferograms are simultaneously and spectrally selectively recorded by the detector 11.

On the measuring system 1, the exit end of the image guide 4 is translated along the x-direction and/or y-direction by a translation device (not shown) in order to scan it over the image field of the optical imaging system 6. The detector 11 is simultaneously scanned in synchronism therewith. The diffraction grating 9 may be mounted such that it may undergo oscillatory motions along the x-direction or y-direction in the image plane of the imaging system 6, driven by a translation device (also not shown), in order to reduce the contrast of the sets of orthogonal of interference fringes generated by the diffraction grating 9.

The computer unit 14 is connected to the monitor 2 and detector 11 by data lines and control lines and controls the electronic generation of the mask pattern on the color monitor, the recording of images, and the readout of the camera 11, as well as any oscillatory motions of the diffraction grating that may be required. The computer unit 14 also computes and analyzes wavefronts detected by the detector. The phase-shift method, which is well-known to specialists in the field and thus will not be discussed in any detail here, is preferably employed for analyzing the resultant interferograms, which requires that the relative phases of the diffraction grating 9 and object pattern be altered in a controlled manner. Their relative phases must be altered in several stages and the associated interferogram cached in the computer unit 14 upon conclusion of each stage. These interferograms are then jointly analyzed.

A special feature of the setup proposed here is that these phase shifts are introduced solely by altering the phase of the mask pattern generated on the color monitor 2 by the computer, without need for any mechanical motions of any parts of the entire measuring system. This approach has significant engineering advantages and cost benefits. Since no parts need to be moved during measurement procedures, expensive mechanisms for generating phase shifts and their associated control electronics may be eliminated. Since no moving parts are required for recording measurement data, measurements are more reliable and more accurate. Furthermore, the screen of the color monitor 2 (or the projection optics employed, in the case of other embodiments) simultaneously serves as a light source and a (variable) illumination mask. Expenditures for separate light sources that would otherwise be required and for fabricating conventional masks (both their substrates and their patterns) are thus eliminated. Also worthy of note is the high degree of flexibility afforded by measuring systems according to the invention. The shapes and dimensions of object patterns may be readily adapted to suit the measurement tasks at hand, which allows testing a wide variety of optical systems, without need for changing the mechanical setup of the measuring system.

Employment of a suitable combination of a polychromatic light source, e.g., a color monitor, and a broadband detector allows simultaneous conduct of test procedures at several different wavelengths, for example, three wavelengths corresponding to the primary colors of additive color mixing. Several "color channels" will then be simultaneously utilizable, where each color channel detects its own, associated, interferogram. This approach (cf. FIG. 6) allows determining the chromatic aberrations of imaging optics under test using a single test procedure.

We shall now describe an example of a measurement in the visible (VIS) spectral region. Wavelengths from the infrared (IR) or ultraviolet (UV) spectral regions may also be exclusively utilized or additionally utilized for making either monochromatic measurements or polychromatic measurements, i.e., measurements at several wavelengths or covering several wavelength ranges. Devices, e.g., suitable coatings inserted into the beam path, that perform frequency conversions may also be employed in order to generate transitions between spectral regions, if necessary. For example, an IR-camera may be employed as detector if a monitor that emits in the VIS spectral region and a frequency-converting secondary radiating surface that absorbs VIS-light and emits in the IR spectral region are employed. Configurable light sources emitting in the IR or UV spectral regions may also be employed.

Figure 1:
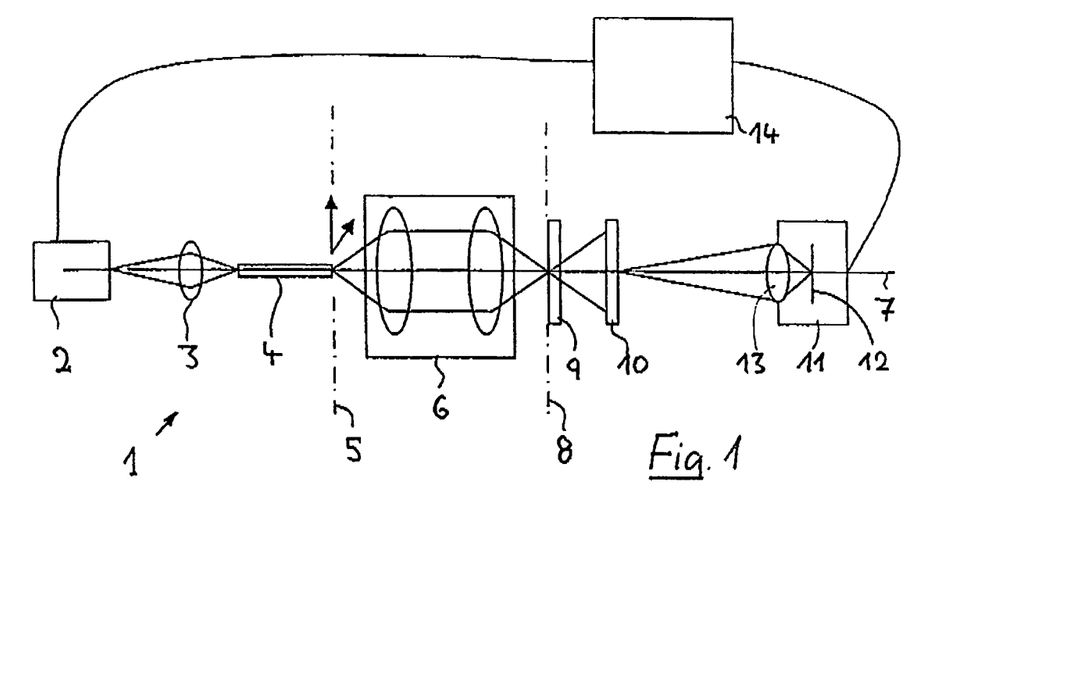
FIG. 1 a first embodiment of a measuring system according to the invention, wherein the pattern-generation device incorporates a projector and an image guide is employed for coupling the object pattern into the imaging system to be tested.

In the case of the following sample embodiments of measuring systems according to the invention, for simplicity, items having the same or equivalent functions as items appearing in FIG. 1 have been assigned the same reference numbers.

Figure 2:
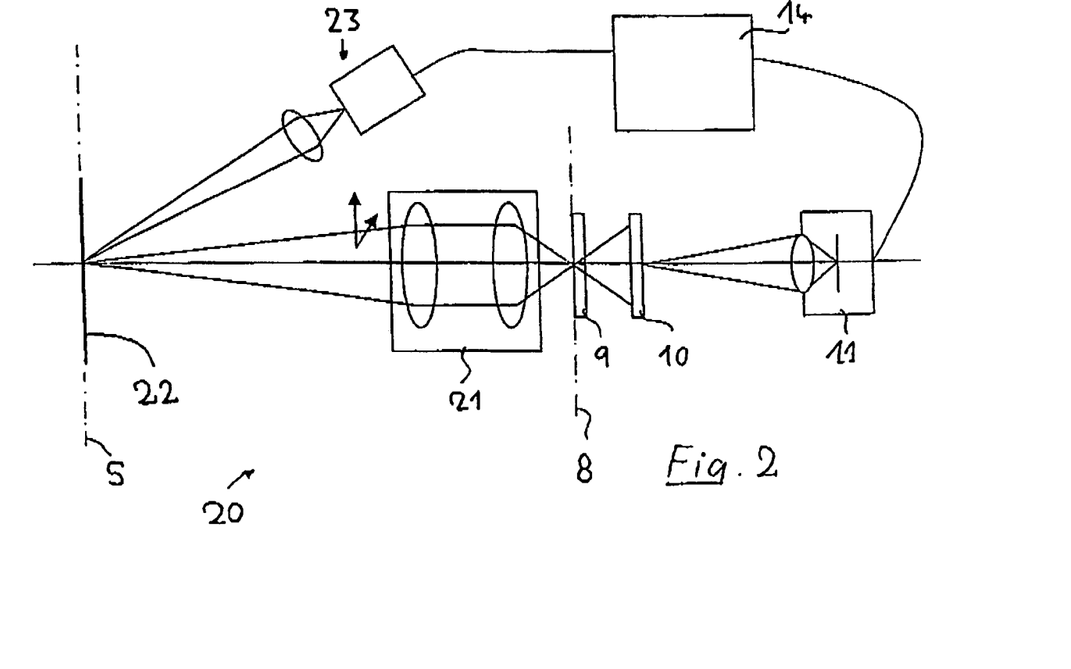
FIG. 2 a second embodiment of a measuring system according to the invention, wherein a secondary radiating surface in the form of a projection screen that is irradiated by a projector is arranged in the object plane of the imaging system to be tested.

The second embodiment of a measuring system 20 according to the invention depicted in FIG. 2 has been optimized for detecting superposition patterns generated by an imaging system 21 to be tested that has a longer object-end focal length than the imaging system 6 depicted in FIG. 1. The former imaging system 21, might, for example, be a telescopic lens. The test setup on the detector end of the imaging system 21 to be tested is identical to that of FIG. 1.

The object plane 5 of the imaging system 21 to be tested, in this particular case, a planar projection screen 22, is arranged on its opposite, object, end. The latter is part of the pattern-generation device, which, in this particular case as well, also comprises a color projector 23 aimed at the projection screen 22. The former serves as a primary light source employed for projecting the makeup of a two-dimensional object pattern onto the planar projection screen 22. The pattern reflected there is the object pattern, which is imaged onto the diffraction grating 9 situated in the image plane 8 of the imaging system to be tested by the optics 21 to be tested. In the case of other embodiments having image-end secondary light sources, a ground-glass plate that is illuminated from the rear and utilized in transmission is provided instead of the projection screen 22. Test setups having object-end secondary radiating surfaces in the form of, for example, projection screens or ground-glass plates, may, for example, be beneficially employed in combination with projecting primary light sources in case where test objects having long focal lengths or image planes situated large distances away are to be measured in cramped quarters. The measurement procedures involved and analysis of the interferograms generated may proceed analogously to the case for the method described in detail in conjunction with FIG. 1.

Figure 3:
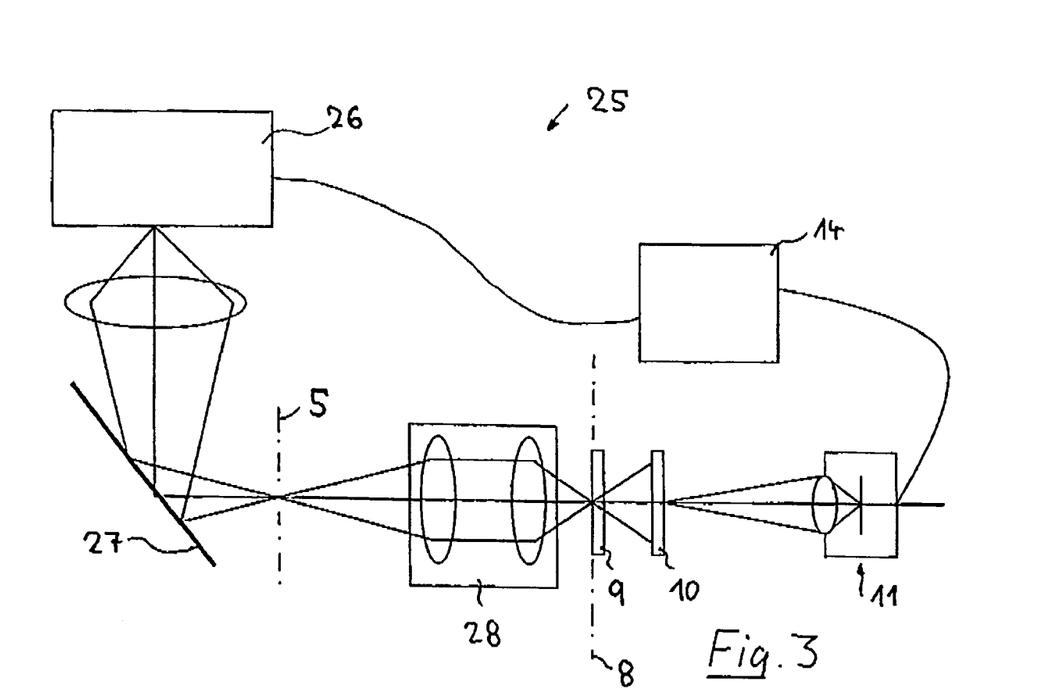
FIG. 3 a third embodiment of a measuring system according to the invention, wherein a deflecting mirror is arranged between a projector and the imaging system to be tested.

The measuring system 25 schematically depicted in FIG. 3 represents a third embodiment of the invention. In this case, the pattern-generation device comprises a projector 20 controllable by the control computer 14 as its primary, electronically configurable, light source. Light emitted by this light source is deflected toward the imaging optics 28 to be tested by a planar deflecting mirror 27 inclined at an oblique angle. An intermediate image containing the object pattern, which is then imaged onto the diffraction grating 9 situated in the image plane 8 of the optics 28, is created in the object plane 5 of the imaging optics 28 to be tested. Detection and analysis of the interferograms generated proceed analogously to the case for those embodiments described above. The object pattern may be electronically or mechanically translated over the object plane in order to allow conducting measurements at various field positions of the image field.

Figure 4:
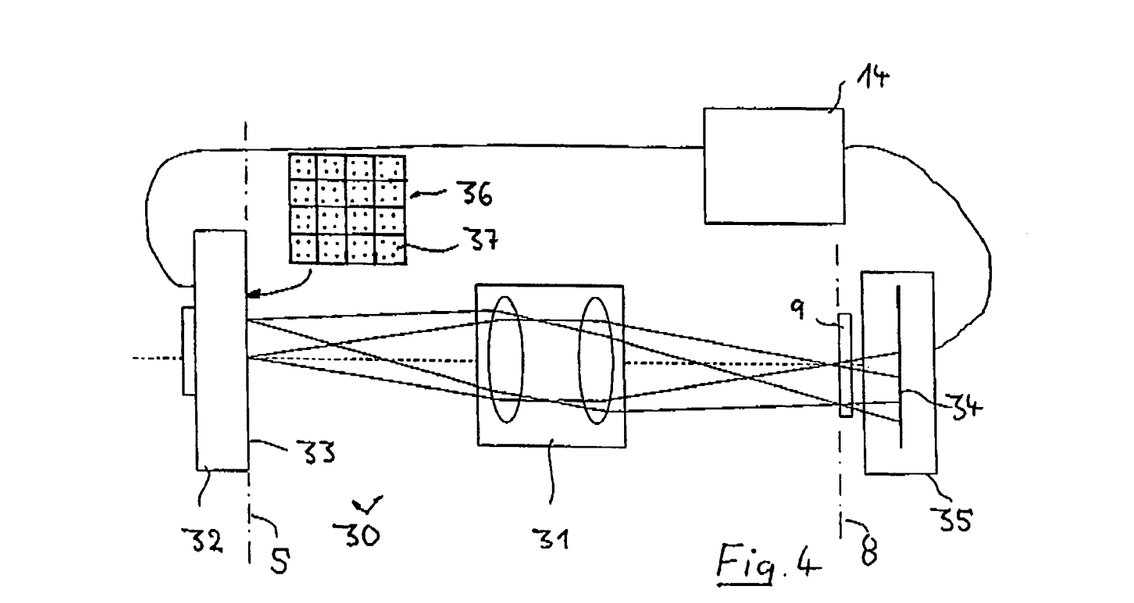
FIG. 4 a fourth embodiment of a (multichannel) measuring system according to the invention that images several object patterns directly onto various field positions on a single monitor.

The measuring system 30 depicted in FIG. 4 represents a fourth embodiment of the invention and is configured for conducting multichannel measurements on optics 31 to be tested. "Multichannel measurements" in the sense of the term used here shall mean that measurements may be simultaneously conducted at several field positions of the optics to be tested, where a distribution of field points that will allow a reliable measurement over the entire image field in a single step should ideally be selected, in which case no translation devices or other devices that allow scanning the image will be required. The measuring system 30 comprises a computer unit 14 that controls a monitor 32 having a large screen such that a preferably regular arrangement 36 of partial sections 37 that essentially cover the entire screen, and each of which has the same, for example, rectangular, shape. These partial sections are controlled by the control device 14 such that each of them has the same patterning, e.g., a regular, two-dimensional, grid composed of points. The surface of the screen 33 is arranged in the object plane 5 of the optics 31 to be tested. This approach allows both imaging the object pattern directly onto the image plane 8 of the optics 31 to be tested and a compact setup, since no additional optical components need be provided between the self-luminous, configurable, light source 32 and the optics 31 to be tested. The object pattern that the optics 31 to be tested images onto its image plane 8 is incident on a diffraction grating 9 that is situated there. The interference patterns occurring behind the diffraction grating serving as a reference pattern fall directly, i.e., without any secondary radiating surfaces having been inserted into the optical path involved, onto a suitably dimensioned CCD-chip 34 of a color camera 35. That is, a compact setup involving a minimum of components (a diffraction grating and camera) has also been implemented on the image end of the system. The measurements involved and analysis of the interferograms generated proceed analogously to the case for those embodiments described above, except that image information from each of several channels is acquired and analyzed simultaneously, which allows conducting extremely rapid measurements covering the entire image field of optics to be tested and a measurement setup that is able to get by without any moving parts.

Figure 5:
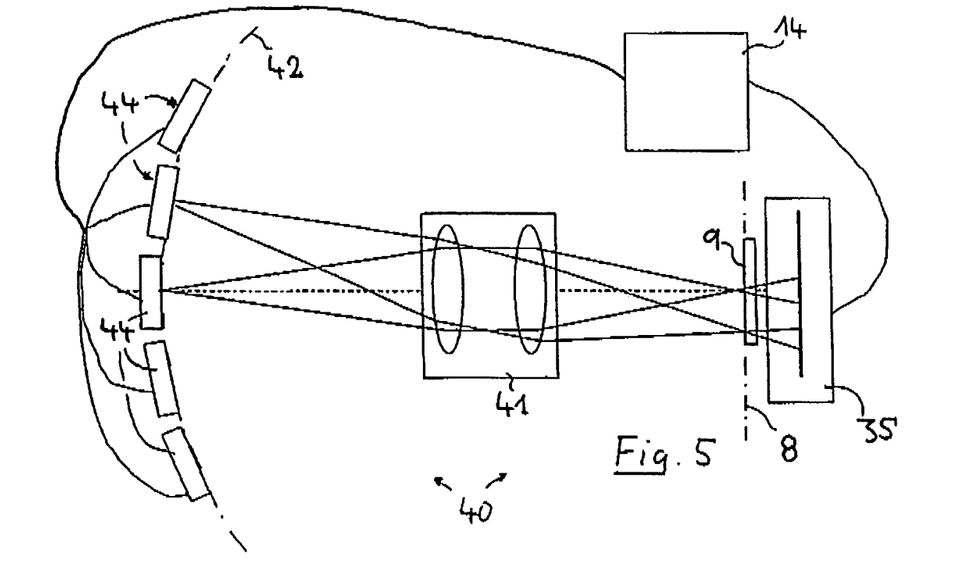
FIG. 5 a fifth embodiment of a measuring system according to the invention for performing multichannel measurements, wherein separate monitors that are arranged on a curved object surface of an imaging system are provided for various field points.

The measuring system 40 depicted in FIG. 5 represents a fifth embodiment of the invention. This particular system is configured for conducting multichannel measurements on a movie-projector lens 41 that is configured for illuminating a cylindrical movie screen and thus has a cylindrical image surface 42 and a planar object surface 8, on which the film to be projected runs when the projector is operated as intended. Measurement of the projection lens takes place in a direction opposite to the normal direction of light propagation, namely, proceeding from the curved image surface 42 that serves as a cylindrical object surface 42 during measurements. A large number of identical color monitors 44 are arranged on the object surface such that the surfaces of their screens facing the lens 41 coincide with the cylindrical object surface 42. These color monitors 44 are simultaneously controlled by the computer unit 14 such that they all display identical patterns, which allows simultaneously conducting measurements at a large number of field points, as in the case of embodiment depicted in FIG. 4. Once again, a compact setup consisting of a diffraction grating 9 and a camera 35 equipped with a large cameral chip only is provided on the image end of the system, as in the case of the embodiment depicted in FIG. 4. An object plane and/or image plane having curvatures other than those illustrated, for example, a dome-shaped image surface like those employed on planetarium projectors, instead of the cylindrical and planar surfaces shown, might also be taken into account. Projection systems, e.g., projection systems having point-source light sources and optimized projection optics or laser projectors, might also be provided instead of the monitors 44.

Figure 6:
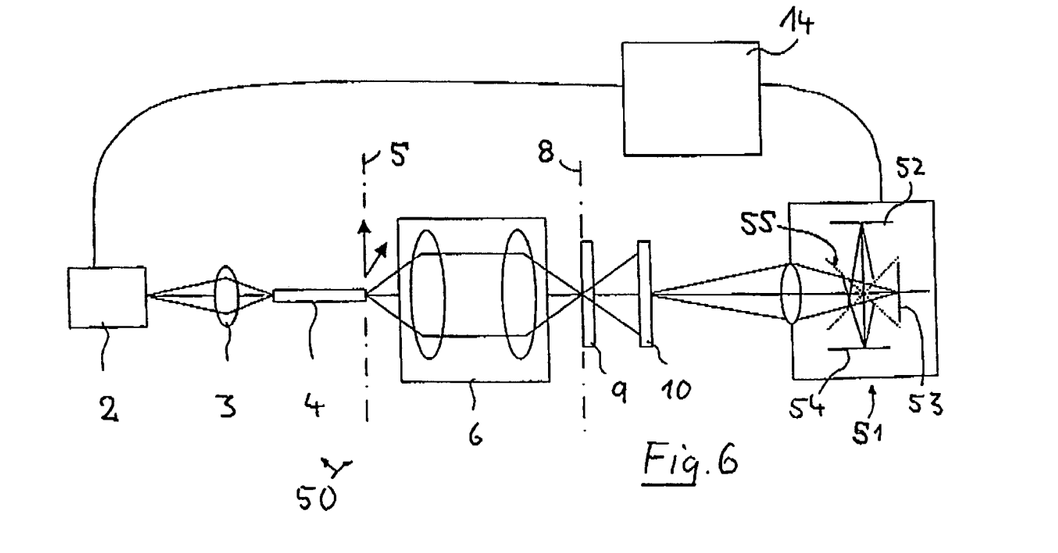
FIG. 6 a sixth embodiment of a measuring system according to the invention having single-channel, polychromatic, illumination and a detector that is responsive to several wavelengths.

The measuring system 50 depicted in FIG. 6 represents a sixth embodiment of the invention with which single-channel, polychromatic, measurements may be conducted. Except for the configuration of its detector, the setup corresponds to that of FIG. 1, which is why the components have been labeled with corresponding reference numbers. The detector 51 comprises a color camera equipped with three, spatially separated, CCD-chips 52-54 and is preceded by a beamsplitting device 55. Each of these CCD-chips is configured for detecting one of the primary colors, red, green, or blue, in order that three different wavelengths, or three different, relatively narrow, wavelengths ranges, may be simultaneously detected. This arrangement takes account of the fact that separate interferograms or superposition patterns that are independent of one another and may be separately detected and analyzed occur for the various wavelengths emitted by the color monitor 2. Employing this approach will allow rapidly, reliably, determining the chromatic aberrations of optics to be tested, where the results obtained for these three colors may serve as reference points when, for example, computing a dispersion curve.

Figure 7:
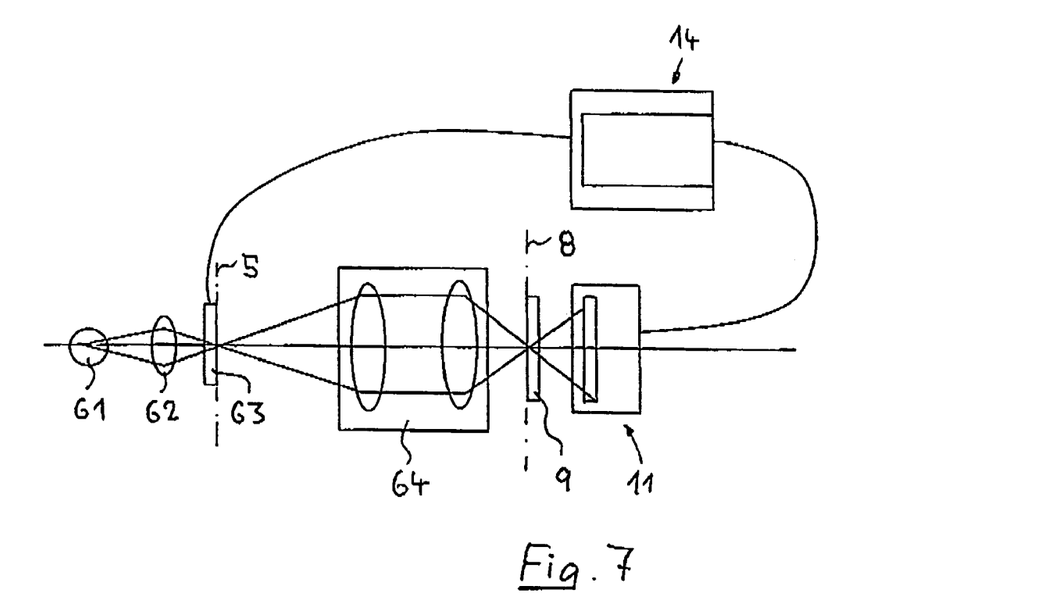
FIG. 7 a seventh embodiment of a measuring system according to the invention having a pattern-generation device that has an electronically controllable, partially transparent, mask unit.

Each of the sample embodiments discussed above based on FIGS. 1-6 utilizes self-luminous, configurable, light sources, for example, light sources having color or monochromatic monitor screens or projectors, where the functions of light source and illumination masks, which, in the case of conventional measuring systems, are separate units, may be combined into a single unit. The seventh embodiment of the invention, to be described below in terms of an example, based on FIG. 7, represents yet another opportunity for generating an object pattern to be imaged in the vicinity of an object surface of an imaging system with the aid of an electronically controllable pattern-generation device. In the case of the measuring system 60 depicted in FIG. 7, the pattern-generation device comprises a light source 61 whose light is directed toward an electronically controllable mask unit 63 situated in the object plane 5 of the imaging system 64 to be tested by the computer unit 14 with the aid of illumination optics 62 that follow the light source in the optical train. The electronically controllable mask unit replaces the rigid chromium masks usually employed on the illumination ends of conventional measuring systems. This mask unit may have an electronically controllable matrix structure whose transmittance, as indicated in FIG. 7, or reflectance may be altered. For example, it might be configured in the form of a liquid-crystal array. This electronically controllable mask unit may assume both the functions of conventional transmission masks or reflection masks and the function of, e.g., phase shifting, in which the location and/or orientation of an inherently unaltered pattern is electronically shifted under software control. Incorporated into the mask unit are, for example, elements, such as liquid-crystal arrays or similar switchable elements, whose reflectances or transmittances are variable under electronic control in spatially resolved manners. In view of the simple means for varying object patterns, the same benefits as for the aforementioned embodiments apply, since the shapes and dimensions of the grating elements may be flexibly adapted to suit the particular measurement task involved. Need for interchanging individual components (chromium masks), as well as the associated need for realignment, are eliminated, as are expenditures for fabricating the components involved. Phase shifting or some other motion of the object pattern without any mechanical motions are realizable by shifting the electronically generated grating pattern, which allows dispensing with expensive precision mechanics and their control electronics.

Another major advantage of electronically controllable masks or patterns of the type described here is the opportunity for conducting automatic calibrations and adjustments of measurement ranges, which might be accomplished by, for example, superimposing a suitable intensity profile on a basic pattern, i.e., distributing a tailored intensity gradient over the image surface. Employing this approach allows adapting a detector-end characteristic curve, for example, the characteristic curve of the camera, including analog/digital converter that provides digitized brightnesses of pixels and the characteristic curve of the transmitter, i.e., the intensity profile of the light-source end, to suit one another. This latter "transmitter characteristic curve" is particularly strongly affected by the digital/analog conversion on the light-source end, the brightnesses of monitor pixels, the need to take account of the spectral reflectance or transmittance of a secondary radiator (projection screen, image guide, ground-glass plate), and the transmittance of the optics to be tested. In addition to the nonlinearities of analog/digital converters or digital/analog converters, the spectral dependence of the responsivity of the detector or sensor surface must also be taken into account, particularly if intensity falloffs toward the perimeters of pupils, which are normally proportional to the cos4 of the angle of incidence, must be compensated by a tailored intensity profile, which will allow emulating a function corresponding to a neutral-density filter. Need for employing separate neutral-density-filter units like those occasionally employed on conventional measuring devices is thus eliminated. Suitably tailoring the intensity profiles of electronically generated mask patterns will thus allow linearizing transmission trains in a simple manner, and maximizing modulation depth or contrast, combined with a favorable signal/noise ratio, on the detector end. Normalizing the measurement range in order to account for underriding limits and saturation limits is also feasible.

Figure 8:
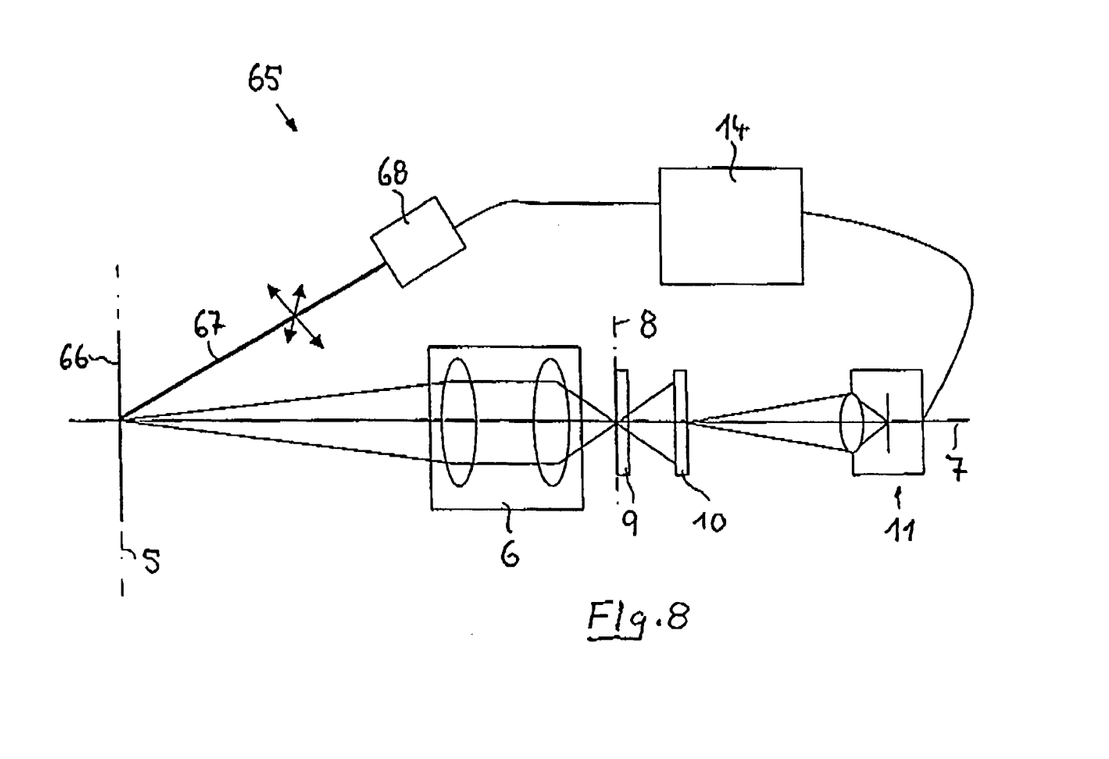
FIG. 8 an embodiment of a measuring system according to the invention that is configured for a writing projection of the object pattern.

FIG. 8 schematically depicts a measuring system 65 wherein a secondary radiating surface 66 formed by a projection screen is irradiated by a light beam 67 that may be moved relative to a secondary radiation surface in a controlled manner such that it "writes" the object pattern onto the secondary radiating surface within a write interval in order to generate the object pattern. A laser projector 68 or similar writing light source is controlled by a computer unit 14 in order to provide this writing projection. Control of the light beam proceeds at a rapid rate using, for example, an ultrafast scanner mirror present in the projector 68 that rapidly shifts the position of the light beam 67 on the projection screen 66. The computer unit 14 also controls the camera 11 serving as detector, where the exposure time of the camera and the "write time" for the mask pattern are synchronized such that the entire mask pattern will be "written" at least once within the exposure time. The write interval, within which the entire mask pattern must be covered by the light beam at least once, should thus be set less than, or equal to, the exposure time. A writing projection involving several light beams, where each of the light beams writes only portions of the overall object pattern, if necessary, is also feasible. The remainder of the setup of the measuring system, complete with the optics 6 to be tested, diffraction grating 9, and ground-glass plate 10, corresponds to the setup shown in FIG. 1 and described in detail in conjunction therewith.

Figure 9:
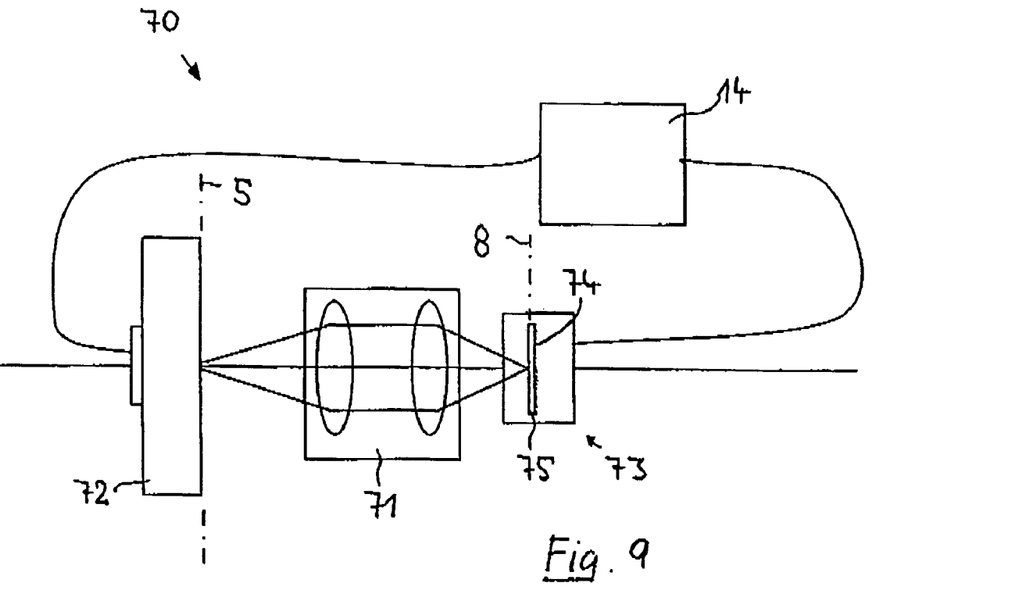
FIG. 9 an embodiment of a measuring system for performing a moiré method, where a reference grating is arranged directly on a transparent cover plate of a CCD-chip.

The foregoing examples have been described based on interferometric measuring systems, where, in particular, a device for detecting wavefronts according to German Patent DE 101 09 929 operating in a manner similar to a shearing interferometer may be utilized. In the case of this particular system, a reference pattern configured in the form of a diffraction grating is situated in the image plane of the imaging system. The superposition patterns (interferograms) resulting from superimposing waves generated by diffraction are detected and analyzed. However, the invention may also be utilized in other measurement techniques, for example, measurement techniques that utilize the moiré effect, in which case, bright-dark superposition patterns generated by superimposing bright-dark patterns are primarily analyzed. An example of a moiré measuring system 70 for determining distortion of optics 71 to be tested is depicted in FIG. 9. The surface of the screen of a monitor 72 that is controlled by a computer 14 that also controls a camera 73 serving as detector and processes signals coming from the camera is situated in the object plane 5 of the optics 71 to be tested. The camera 73 has a CCD-chip 74 whose sensor elements are covered and protected by a transparent cover, for example, a cover glass 75, as its sensor surface. A reference pattern or image grating situated in the image plane 8 of the optics 71 to be tested is applied directly on this cover glass. The associated object pattern is electronically generated by in the object plane 5 by the monitor 72. If the object pattern is imaged onto the image pattern by the optics 71 to be tested, then the CCD-chip will detect a two-dimensional intensity pattern that is generated by superimposing the imaged object pattern on the reference pattern and contains information on the imaging fidelity of the optics 71 to be tested. Procedures for conducting such moiré methods and analyzing the results obtained are well-known to specialists in the field, and thus will not be discussed in any detail here.

Figure 10:
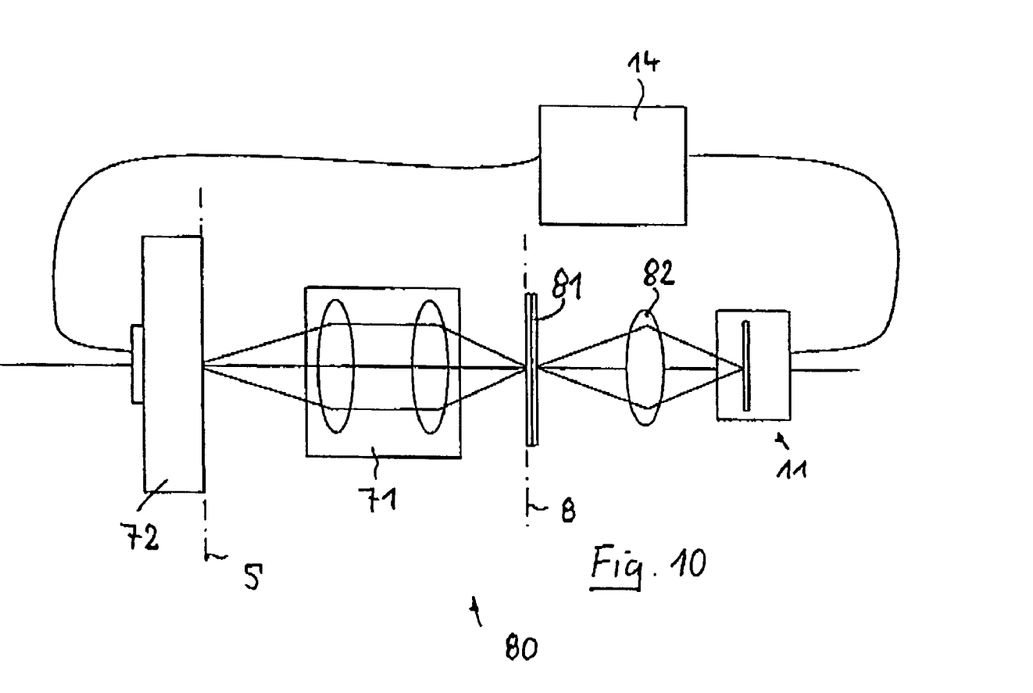
FIG. 10 an embodiment of a measuring system for performing a moiré method, where a secondary radiating surface is arranged in the immediate vicinity of the reference grating.

The measuring system 80 depicted in FIG. 10 is also configured for distortion measurements employing moiré techniques and differs from the measuring system 70 depicted in FIG. 9 only in relation to the elements on its detector end. The reference pattern is situated in the immediate vicinity of the planar image surface 8. A secondary radiating surface 81 that may be configured in the form of a scattering surface and/or a frequency-conversion surface is situated in the immediate vicinity of the reference pattern, in particular, directly on the image plane or a short distance behind the image plane. Incorporating a scattering plate in this vicinity may destroy the spatial coherence and thereby suppress the Talbot effect. The Talbot effect generates a self-image of the reference grating at periodic distances behind the reference grating, and thus generates additional, "false," sets of moiré fringes, and would thus falsify measurement results. The separation of Talbot orders depends upon the grating period and the wavelength involved. If a frequency conversion is required because, for example, the spectral responsivity range of the detector 11 has been poorly matched to the spectral emission range of the structured light source 72, that may be accomplished by, for example, by means of a thin, fluorescing, grating substrate on a thick, glass, carrier or by means of a sandwich having a relatively thin, transparent, grating substrate on the thick carrier substrate, with a fluorescing layer that may, for example, contain an optical cement into which a fluorescing powder has been admixed, sandwiched between them. In any event, intensity distributions occurring in the vicinity of the image plane are imaged onto the sensor surface of the detector 11 with the aid of imaging optics 82. Since the reference grating, together with a ground-glass plate or some other secondary surface, is situated in the image plane 8, the imaging optics 82 images the image field occurring there directly onto the sensor surface of the camera.

Figure 11:
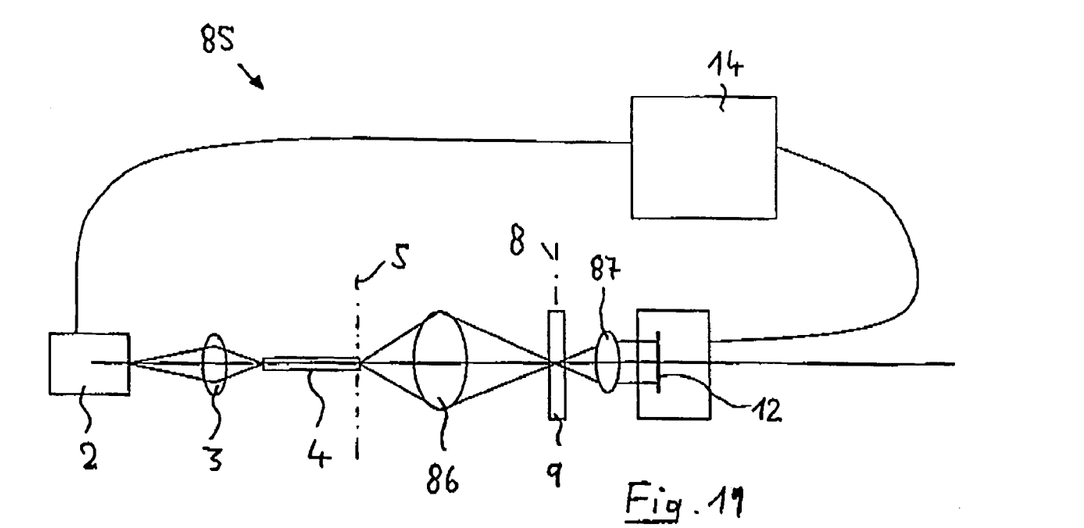
FIG. 11 an embodiment of a measuring system that is configured in the form of a radial-shearing interferometer.

We shall now discuss a new type of measuring method made possible by the invention whose essential element is employment of radially symmetric patterns for which a phase shift along the radial direction is possible, based on the measuring system 85 depicted in FIG. 11. In particular, its electronic pattern generation allows simultaneous, equidistant, phase shifts of radial gratings. Phase shifting in simultaneous, equidistant, steps simplify phase analyses. In particular, the method may be employed in the case of shearing interferometers and moiré methods. Particularly useful in that conjunction is generation or employment of rotationally symmetric patterns, which represent a special case of radially symmetric patterns, and, in particular, may be employed to major advantage in cases where rotationally symmetric errors are of interest or dominant. Such may be the case when testing aspherical optics, where large dynamic ranges that may be obtained by adjusting the grating period are required in the case of large asphericities.

The example depicted in FIG. 11 illustrates a prospective setup of a radial-shearing interferometer for wavefront measurements on a single lens 86 that may be either a spherical lens or an aspherical lens. The pattern-generation device comprises a monitor 2 that serves as the two-dimensional, incoherent, light source of the measuring system, controlled by a computer 14. The image of the monitor is imaged onto the entrance surface of a flexible image guide 4 whose exit surface is arranged in the object plane 6 of the optics 86 to be tested by imaging optics 3. The exit end of the image guide is translatable along both axes, normal to the optical axis. The diffraction grating 9 is situated in the image plane 8 of the optics 86 to be tested. This grating is a followed by a microscope objective that directs the wavefronts of the superposition pattern to the sensor surface 12 of the camera 11.

Interferometric testing of the transmittances of singlet lenses usually requires employment of compensating optics due to their large spherical aberrations, since the wavefront gradients cause very spatially dense interference fringes that thus may no longer be resolvable by the detector. The purpose of the compensation optics is compensating for the large gradients generated by the optics to be tested in order that the remaining wavefront distortions will fall within the resolution range of the interferometer. Standard types of interferometers, such as Fizeau interferometers or Twyman-Green interferometers, may be employed if compensation optics are employed. However, compensation optics may be elaborate, since they normally have to individually designed and calibrated for each optical system to be tested. Compensation for rotationally symmetric aberrations is typical, since it may be accomplished by employing combinations of spherical singlet lenses.

Figure 12:
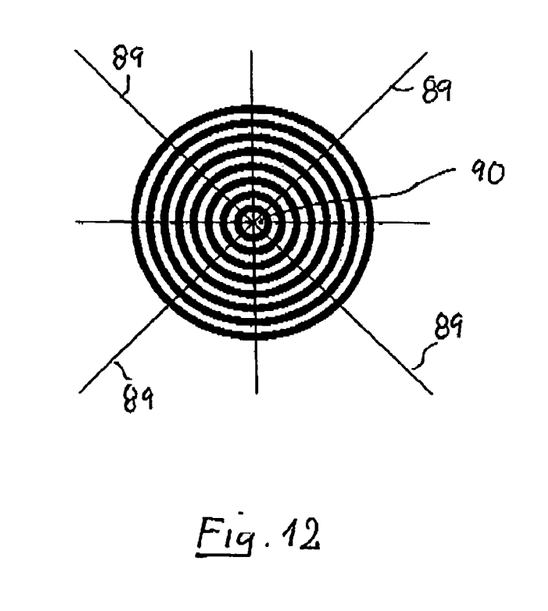
FIG. 12 a schematized representation of a rotationally symmetric object pattern having concentric circles.

A special feature here is that the monitor 2 generates a rotationally symmetric object pattern consisting of concentric, circular, lines (cf. FIG. 12). The diffraction grating 9 has a corresponding, rotationally symmetric, pattern of concentric, circular, lines.

Figure 13:
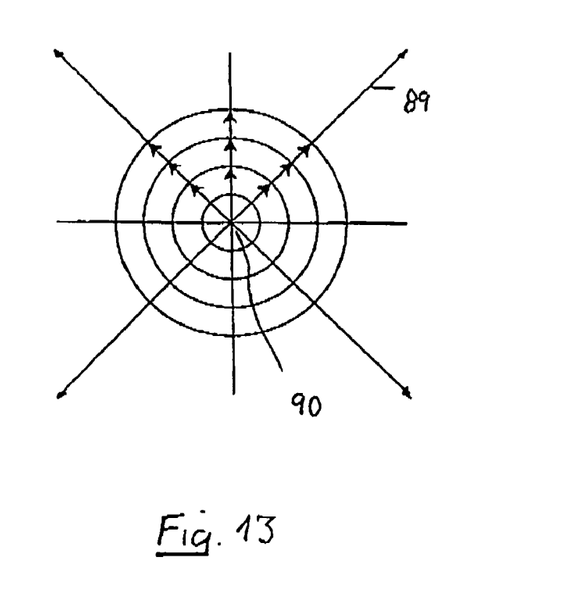
FIG. 13 a schematized representation of the radially oriented diffraction orders associated with the pattern shown in FIG. 12 that correspond to the shearing directions.

In the case of any measurement method that involves phase shifting grating lines, the grating pattern will invariably have to be translated normal to the grating lines, where the grating constant must remain unchanged thereby. For example, in the case of the lateral-shearing interferometer mentioned above, a simple linear translation of the entire grating along a direction normal to the grating lines is required. Correspondingly, a translation normal to the circular grating lines, i.e., along the radial direction 89, referred to the center of symmetry 90, which also represents the translation center of phase shift, is also required in the case of a rotationally symmetric pattern. Such a radial translation, for which the grating period, i.e., the radial spacing of the grating lines, must remain unchanged, is, in principle, impossible in the case of rigid gratings, e.g., chromium-on-glass gratings. In the case of gratings on stretchable carriers, although a stretching or compression is feasible, it would alter their grating constant. However, the invention allows phase shifts along the radial direction while leaving grating constants unchanged. As has been schematically indicated in FIG. 13, the diffraction orders are orthogonal to the grating lines, which also correspond to the shearing directions or directions of the phase shifts involved. An unchanged grating period during phase shifting causes the diffraction angle in the radial direction to remain constant, which greatly simplifies analyses of the resultant data. The interferograms (shearograms) obtainable using this method thus yield the wavefront displacements along the radial direction.

Figure 14:
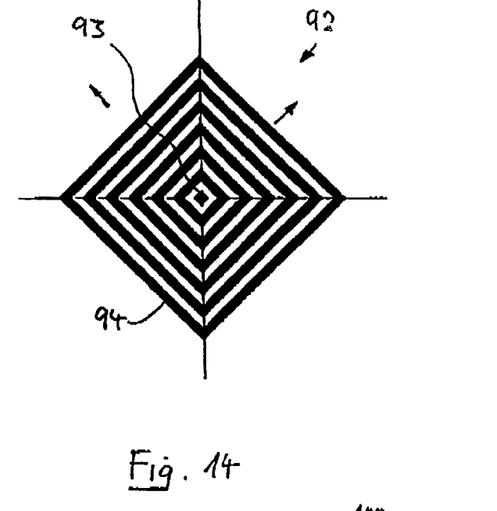
FIG. 14 an example of a radially symmetric object pattern having fourfold symmetry.

The invention also allows adapting the geometry of the object pattern to suit the measurement task involved in a simple manner. As an example thereof, FIG. 14 depicts a radially symmetric object pattern 92 having fourfold symmetry that is transformed into itself for every 90° rotation about its center of symmetry 93. This pattern has four mutually orthogonal grating directions along which equidistant, straight, grating lines 94 lie. Associated with this pattern are two orthogonal diffraction directions, indicated by the arrows. Patterns of this type may, for example, be employed for testing pyramids, corner cubes, or objects having similar geometries. The translation directions normal to the grating lines, or along the direction of the diffraction orders, in the quadrants may be either in the same direction or in opposite directions. Radially symmetric patterns or gratings having other than fourfold symmetry are also feasible. Careful selection of the translation directions will simplify correct determinations of algebraic signs when analyzing measurement results.

In the case of patterns or gratings having radial symmetry, problems related to determining the algebraic signs of phases during phase shifts may occur. In the case of a radial pattern, the phase of the grating changes along the radial direction, which means that the algebraic sign reverses over its diameter, namely, at its center or translation center. The resultant phase thus also undergoes a change of algebraic sign that must be taken into account when computing phases. Since it may not be perfectly clear where the reversal of algebraic sign must occur, it will be beneficial if, in addition to a radial phase shift, a lateral phase shift (linear phase shift) along a radius or along several radii is also performed in order to check the algebraic sign and verify the consistency of measurements. Such phase shifts involve displacing the entire pattern along one or more diameters by fractions of a grating period along lines passing through the symmetry origin (translation center). The phase shift involved is thus in the same direction over the entire diameter of the pattern and the location where the reversal of algebraic sign occurs may be uniquely determined. If the lateral phase shift is performed along two directions that are inclined with respect to one another, the coordinates of the center, i.e., the coordinates of translation center, may also be uniquely determined.

Figure 15:
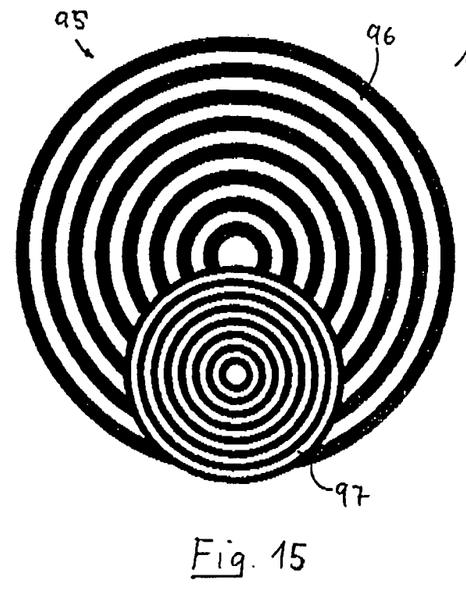
FIG. 15 an example of an object pattern having two zones that may be separately utilized for measuring a bifocal lens.
Figure 16:
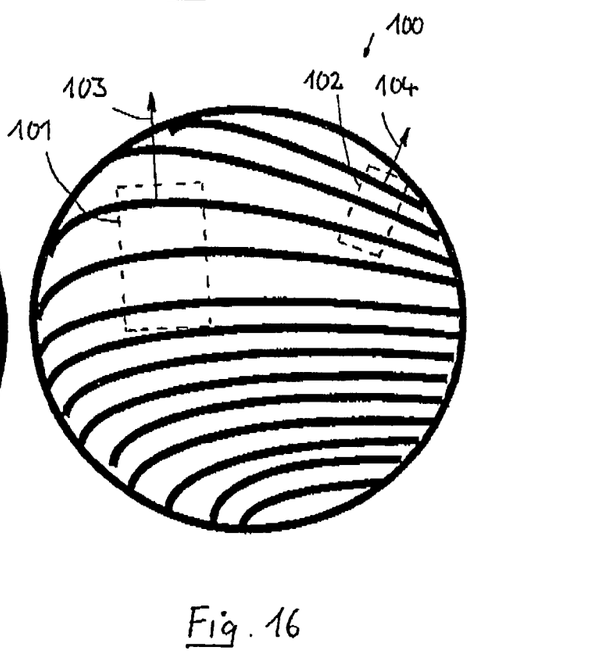
FIG. 16 an object pattern having a gradually varying periodicity direction and periodicity for measuring progressive lenses.

FIGS. 15 and 16 depict two other options for adapting the pattern periodicities and periodicity direction or grating orientation of the grating/mask combination to suit the measurement task involved. The object pattern 95 shown in FIG. 15 is intended for measuring optics to be tested that have two focal lengths. It has two sections or zones 96, 97 having rotationally symmetric patterns having differing grating periods, where the small, circular, zone 97 has a complete, rotationally symmetric, pattern, and the large, essentially circular, zone 96 has an incomplete, rotationally symmetric, pattern having a larger grating period. The phase shifts along radial directions toward the centers of the respective patterns may be performed separately for each of the zones. The locally alternating signals are analyzed in the manner usually employed in the case of phase shifts.

FIG. 16 depicts an object pattern 100 that has a continually changing periodicity direction and periodicity, where both changes are locally normal to the grating lines, within a circular patterned area, and shows the periodicity, or separations of the grating lines. For example, the spacing of the grating lines within the zone 101 enclosed by the dotted line is greater than that within the other zone 102 enclosed by the dotted lines, and the periodicity directions 103, 104, which correspond to the shearing directions or translation directions, are inclined at an angle of about 20° with respect to one another. A gradual transition in both periodicity length and periodicity direction occurs between these zones. The phase shifts for various zones, each of which may be suitably spatially delimited, may be performed separately for each zone in conjunction with measurements. Patterns of this type are suitable for, for example, testing aspherical eyeglass lenses or progressive lenses whose refractive powers gradually change over their surfaces.

Figure 17:
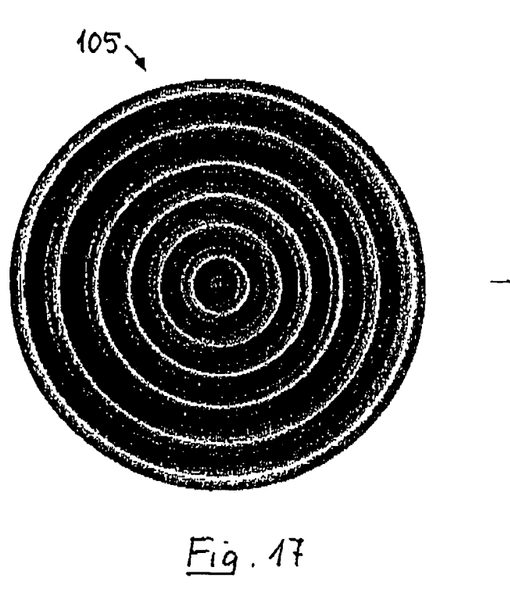
FIG. 17 a rotationally symmetric object pattern having a sinusoidal transmittance function along the radial direction.

FIG. 17 depicts an example of an, on the whole, circular, rotationally symmetric, object pattern 105 that demonstrates that, thanks to the invention, even nondigital masks or patterns may be readily generated. Termed "nondigital" here are patterns whose transmittance functions, or reflectance functions, can take on values other than 0 or 1, i.e., patterns having gray scales. Patterns of this type are usually rather difficult to generate employing, for example, dithering techniques. In the case of electronic pattern generation, on the other hand, the control systems required are only slightly more complex than those required for generating digital patterns, such as those depicted in, for example, FIGS. 14-16. This particular pattern 105 has a sinusoidal transmittance function along the radial direction, i.e., a transmittance that gradually changes from values close to 0 and values close to 1 and back again along the radial direction. A mask of this type having a sinusoidal transmittance function optimizes interference-fringe contrast for the zeroth and first diffraction orders. Fringe contrast for all other orders (interfering terms), on the other hand, is reduced to zero. "Holes" having a Gaussian profile are suitable for suppressing interfering terms. Masks of this type having gray scales thus simplify analysis of the results of measurements and may yield more accurate measurements. Masks or patterns having gray scales extending over at least part of their patterned areas may be utilizable in conjunction with conventional patterns, for example, cross-hatched patterns, line gratings, checkerboard gratings, or similar, as well as those types of patterns that have been described here in terms of examples.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A measuring arrangement comprising:
    an imaging system including a plurality of optical elements configured to image an object pattern provided in an object surface of the imaging system into an image surface of the imaging system;
    a reflective mask unit including a plurality of switchable elements configured to be controlled electronically to form a reflective object pattern arranged in the object surface of the imaging system;
    a controller connected to the reflective mask unit and configured to control the reflective object pattern using electronic signals;
    a reference pattern unit configured to provide a reference pattern arranged in a vicinity of the image surface of the imaging system;
    a detector configured to resolve spatially superimposed patterns generated by imaging the object pattern onto the reference pattern; and
    a device configured to determine at least one parameter indicative of the imaging fidelity of the imaging system from the superimposed pattern.

2. The measuring arrangement according to claim 1, wherein the imaging system is a projection lens configured for photolithographic fabrication of at least one of semiconductor devices and other types of micro devices on a sub micrometer scale.

3. The measuring arrangement according to claim 1, further comprising an illumination system configured to illuminate the reflective mask unit.

4. The measuring arrangement according to claim 3, wherein the illumination system includes at least one of refractive elements, diffractive elements, microlenses, and fiberoptic lightguides.

5. The measuring arrangement according to claim 1, wherein the reflective mask unit comprises at least one partially reflective mask having a two-dimensional, reflective mask structure that is at least one of electronically generated and electronically altered.

6. The measuring arrangement according to claim 5, wherein the reflective mask unit includes at least one electronically controlled component configured to provide a spatial variation in reflectance of the mask structure.

7. The measuring arrangement according to claim 1, wherein the reflective mask unit comprises at least one liquid-crystal array.

8. The measuring arrangement according to claim 1, wherein the object surface has at least one of a one-axis and a multi-axis curvature.

9. The measuring arrangement according to claim 1, configured to make measurements at plural field points of the imaging system.

10. The measuring arrangement according to claim 9, configured to simultaneously make measurements at plural field points of the imaging system in a multichannel measurement.

11. The measuring arrangement according to claim 9, configured to translate at least one of the object patterns from one of the field locations to another of the field locations between measurements in order to allow making measurements at the plural field locations.

12. A method of operating a measuring arrangement according to claim 1 comprising:
    controlling the reflective object pattern such that the reflective object pattern is adapted to the reference pattern such that a moiré pattern is formed as a superimposed pattern; and
    evaluating the moiré pattern to determine at least one imaging parameter.

13. A method of operating a measuring arrangement according to claim 2 comprising:
    controlling the reflective object pattern such that the reflective object pattern is adapted to the reference pattern such that an interferogram is formed as a superimposed pattern; and
    evaluating the interferogram to determine at least one imaging parameter.

* * * * *